Jan. 9, 1968 E. P. JOHNSON 3,362,671
SUSPENSION ASSEMBLY
Filed May 4, 1966
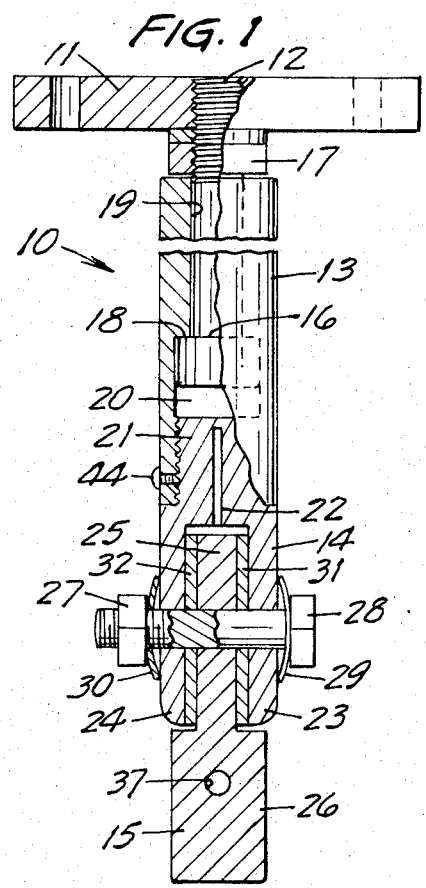
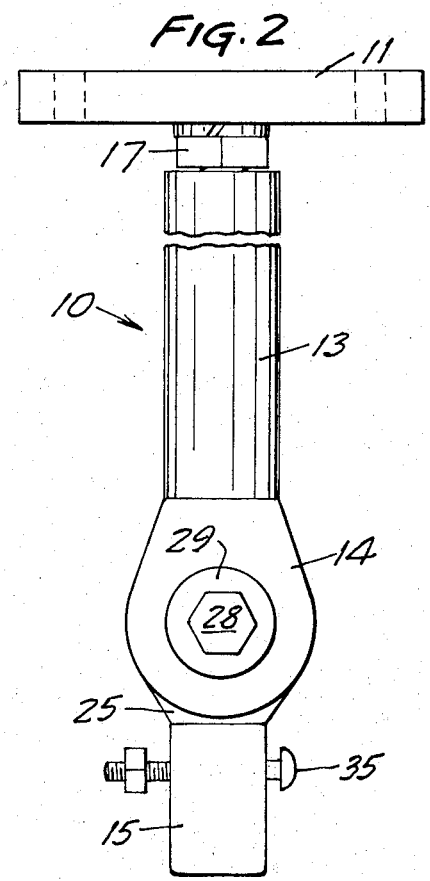
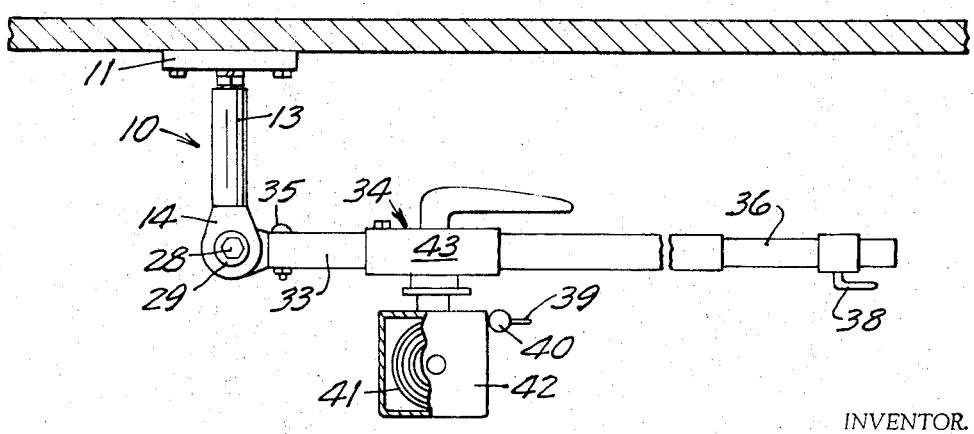
INVENTOR.
ELWOOD P. JOHNSON
BY
Carpenter, Kinney & Coulter
ATTORNEYS

United States Patent Office 3,362,671
Patented Jan. 9, 1968

3,362,671
SUSPENSION ASSEMBLY
Elwood P. Johnson, Newport, Minn., assignor to Minnesota Mining & Manufacturing Company, St. Paul, Minn., a corporation of Delaware
Filed May 4, 1966, Ser. No. 547,615
4 Claims. (Cl. 248—324)

This invention relates to visual displays and in particular to mounting means for classroom projection screens.

Modern techniques of classroom instruction make ever increasing use of overhead projectors. In order to display a projected image without "keystoning" or other dimensional distortion it is necessary that the projection screen be held perpendicular to the axis of the projected cone of light. The present invention is particularly directed to view-screen suspension means for attaining this desired result while still providing for convenient overhead storage of the screen during periods of non-use.

A presently preferred form of the device is illustrated in the appended drawing, in which FIGURE 1 is a front elevation largely in section, and
FIGURE 2 is a side elevation of the device, and
FIGURE 3 is a side elevation of the device as installed and with the view-screen, show in partly cut-away section, attached and in storage position.

The suspension device 10 includes a mounting plate 11 supporting a stud 12 from which depends a tubular sleeve 13, clevis 14 and mounting stud 15. As shown in FIGURE 1, the enlarged head of the stud 12 provides a radially extending inner supporting shoulder 16 providing a bearing surface contacting the inner ledge 18 disposed within the sleeve 13 at the juncture of the smaller bore 19 and larger bore 20. The shank of the stud 12 fits closely within the smaller bore 19 so that the sleeve 13 may be rotated while still being held snugly in place.

The lower portion of the wall of the larger bore 20 is threaded to receive the threaded stud 21 of the clevis 14, the same being further held in place by a retaining pin 44. The clevis stud is partially longitudinally divided by means of a narrow compression slot 22 to permit slight opening and closing movement of the two arms 23, 24 of the clevis 14. The same effect is obtainable by making the clevis member of two separate identical halves held apart along the upper edge by suitable projections in place of the bridging portion shown in FIGURE 1 across the upper end of the slot 22.

The upper tongue portion 25 of the mounting stud 15 is suspended between the arms of the clevis by a bearing pin 28 on which are also mounted spring washers 29, 30 and friction discs 31, 32.

The lower portion 26 of the mounting stud 15 is dimensioned to fit snugly within the end of the outer section 33 of the collapsible tubular mast of the screen assembly 34, the mast being held in place by a bolt 35 passing through a hole 37 in the section 26. The inner section 36 of the tubular mast carries at its outer end a hook member 38 designed to receive a ring 39 attached to the cross member 40 of the viewing screen 41 as shown in FIGURE 3. The screen is contained within a box 42 supported on a sliding support member 43 carried by the tube 33 and provided with adjusting handle and lock means for positioning on the supporting mast. The screen assembly 34 is commonly available with an attached foldable tripod supporting means, which is removed for purposes of the present invention.

The mounting plate 11 may be bolted directly to an overhead or ceiling beam as indicated in FIGURE 3, or alternatively may be supported from framework attached to such beams. The lengths of the sleeve 13 and of the stud 12 are determined by the particular mounting employed. The stud 12 is locked in position in the plate 11 by means of a lock nut 17 and washer, and the stud is positioned so as to permit a slight degree of clearance between the lower surface of the nut 17 and the upper surface of the sleeve 13. Lubrication of the parts prior to assembly facilitates smooth rotation of the sleeve about the stud and on the supporting shoulder 16.

The friction discs 31, 32 are conveniently formed of hard asbestos-phenolic brake-lining composition and provide fully adequate frictional support when placed under appropriate compression between the arms 23, 24 of the clevis and the corresponding surfaces of the tongue 25, pressure being applied by the bolt 28 and nut 27 and maintained by the compressed spring washers 29, 30.

The tip 26 of the mounting stud 15 may be of any shape required to fit within the end of the hollow mast 33 of the screen assembly 34. Tubular shafts of both square and triangular cross-section are used in various commercially available screens, and the device of this invention permits easy interchange of stud members as required for a particular screen.

In use, the screen assembly is lowered, by rotation about the pin 28, into the desired angular position with respect to the projector; the inner shaft 36 is extended and locked into position; the screen is withdrawn from the box 42; and the ring 39 is placed over the hook 38, to maintain the position of the screen against the return force of the spring wind-up mechanism. The screen may also be swiveled about on the mounting stud 12 to permit of projection from various points in the classroom, and in all cases with the projection screen at the angle required to place the screen surface perpendicular to the axis of the cone of light from the projector. Thus it becomes possible to mount a screen centrally of a large classroom and to place a projector anywhere within a full circle about the screen while still projecting undistorted images. When not in use, the screen is rolled up, the mast is collapsed, and the screen assembly is swiveled into the storage position illustrated in FIGURE 3.

A typical classroom projection screen may have a total viewing area of 4 ft. x 4 ft. and a suspension device for such a screen may have the following dimensions. The shaft of the stud 12 is one-half inch in diameter; the diameter of the head is ¾ inch. The sleeve 13 has an outside diameter of 1⅛ inch. The tongue 25 of the mounting stud 15 has a thickness of ⅜ inch. Each of the friction discs 31, 32 is ⅛ inch thick and 1⅞ inch in diameter. The steel spring washers 29, 30 are 1/16 inch thick and about 1 inch in diameter.

What I claim is:

1. An overhead support member for a retractable projection screen or the like comprising, in combination, a mounting plate, a supporting stud carried by the plate, a rotatable tubular sleeve supported by said stud, a clevis attached to said sleeve, a mounting stud, and friction bearing means supporting said mounting stud in said clevis.

2. The overhead support member of claim 1 wherein the inner surface from one end of said tubular sleeve is of a smaller diameter permitting snug rotatable positioning over the shaft of said supporting stud, the inner surface from the other end of said sleeve is of a larger diameter than the head of said supporting stud, and the inner ledge (18) interconnecting the two inner surfaces (19, 20) rotatably bears against the extending inner surface (16) of said head.

3. The overhead support member of claim 2 wherein said clevis includes two extended arms (23, 24) interconnected at one end by a stud member (21) retained within the said other end of said sleeve and slotted across the full stud diameter from between said two arms to a position adjacent the end to permit movement of said arms toward and away from each other.

4. The overhead support member of claim 3 wherein said friction bearing means includes friction discs (31, 32) between said mounting stud and said clevis arms, spring washers (29, 30) at the outer surfaces of said arms, and an adjustable compression-applying pin (28) for supporting said mounting stud in said clevis and for applying friction-inducing compression through said spring washers against said clevis arms and friction discs.

References Cited

UNITED STATES PATENTS

| | | | |
|---|---|---|---|
| 557,732 | 4/1896 | Wade | 248—324 |
| 1,065,155 | 6/1913 | McCanse | 248—323 |
| 2,174,747 | 10/1939 | Hueglin | 248—343 |
| 2,830,707 | 4/1958 | Schmidt et al. | 248—323 XR |
| 2,951,716 | 9/1960 | Myers | 285—273 |

JOHN PETO, *Primary Examiner.*